US012769475B2

(12) United States Patent
Oh et al.

(10) Patent No.: US 12,769,475 B2
(45) Date of Patent: Oct. 20, 2026

(54) MEMORY DEVICE

(71) Applicant: SK hynix Inc., Icheon-si (KR)

(72) Inventors: Su Jeong Oh, Icheon-si (KR); Sung Ho Bae, Icheon-si (KR); Je Bock Chung, Icheon-si (KR); Beom Seok Hah, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 156 days.

(21) Appl. No.: 18/734,649

(22) Filed: Jun. 5, 2024

(65) Prior Publication Data

US 2025/0199709 A1 Jun. 19, 2025

(30) Foreign Application Priority Data

Dec. 15, 2023 (KR) ........................ 10-2023-0183337

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ......... G06F 12/0246; G06F 2212/7204; G06F 3/061; G06F 3/0616; G06F 3/064; G06F 3/0652; G06F 3/052; G06F 3/0604; G06F 3/0679
USPC ............ 365/185.23, 185.29, 185.11, 185.19, 365/185.18, 185.22, 185.03
See application file for complete search history.

(56) References Cited

U.S. PATENT DOCUMENTS 9,490,021 B2 * 11/2016 Yang .................. G06F 12/0246
2012/0320685 A1 12/2012 Yu et al.

FOREIGN PATENT DOCUMENTS

DE 102021201252 A1 * 10/2021 ............. G11C 16/14
KR 1020150049908 A 5/2015

* cited by examiner

*Primary Examiner* — Amir Zarabian
(74) *Attorney, Agent, or Firm* — WILLIAM PARK AND ASSOCIATES LTD.

(57) ABSTRACT

A memory device includes memory cells and a control unit. The memory cells are coupled in series between one or more first selection transistors coupled in series to a source line and one or more second selection transistors coupled in series to a bit line. The control unit is configured to apply, during a forcing period that is part of a rising period during which an increasing erase voltage is applied to the bit line, an increasing selection voltage to local selection lines coupled to the one or more first selection transistors and the one or more second selection transistors.

19 Claims, 6 Drawing Sheets

MEMORY DEVICE

CROSS-REFERENCES TO RELATED APPLICATION

The present application claims priority under 35 U.S.C. § 119(a) to Korean patent application number 10-2023-0183337 filed on Dec. 15, 2023, in the Korean Intellectual Property Office, which application is incorporated herein by reference in its entirety.

BACKGROUND

1. Technical Field

Various embodiments relate to a memory device, including, but not limited to, erasing a memory device.

2. Related Art

An electronic device includes many electronic elements and a computer system because the electronic device includes many semiconductor apparatus, each configured with a semiconductor. Among the semiconductor apparatus constituting a computer system, a host device, such as a processor or a memory controller, may be in data communication with a memory device. The memory device may include a plurality of memory cells, which may be addressed by word lines and bit lines to store data.

The memory device may perform an erase operation to erase data. In order to ensure data reliability when completely erasing data from memory cells, technical measures may be required to effectively perform the erase operation.

SUMMARY

In an embodiment, a memory device may include memory cells and a control unit. The memory cells may be coupled in series between one or more first selection transistors coupled in series to a source line and one or more second selection transistors coupled in series to a bit line. The control unit may be configured to apply, during a forcing period that is part of a rising period during which an increasing erase voltage is applied to the bit line, an increasing selection voltage to local selection lines coupled to the one or more first selection transistors and the one or more second selection transistors.

In an embodiment, a memory device may include memory cells and a control unit. The memory cells may be coupled in series between one or more first selection transistors coupled in series to a source line and one or more second selection transistors coupled in series to a bit line. The control unit may include a connection unit coupled between global selection lines and local selection lines coupled to the one or more first selection transistors and the one or more second selection transistors, may be configured to enable the connection unit during at least part of a rising period until a forcing period ends, during which rising period an increasing erase voltage is applied to the bit line, and may be configured to disable the connection unit at an end of the forcing period.

In an embodiment, a memory device may include memory cells and a control unit. The memory cells may be coupled in series between one or more first selection transistors coupled in series to a source line and one or more second selection transistors coupled in series to a bit line. The one or more first selection transistors and the one or more second selection transistors may be coupled to local selection lines. The control unit may be configured to increase voltages of the local selection lines to a target selection voltage during a rising period, during which rising period an increasing erase voltage is applied to the bit line, and may be configured to float the local selection lines before an end of the rising period.

In an embodiment, a method may include increasing a voltage applied to a bit line of a memory device during a rising period; applying a ground voltage to local selection lines of the memory device during the rising period until a forcing period begins within the rising period; when the forcing period begins, increasing the voltage at the local selection lines; floating the local selection lines when the forcing period ends; when the voltage at the bit line reaches a target erase voltage, maintaining the target erase voltage at the bit line during an erasing period while data stored in the memory device is erased.

DETAILED DESCRIPTION

Various embodiments of the present disclosure provide a memory device that can effectively perform an erase operation without consuming unnecessary current.

Figure 1:
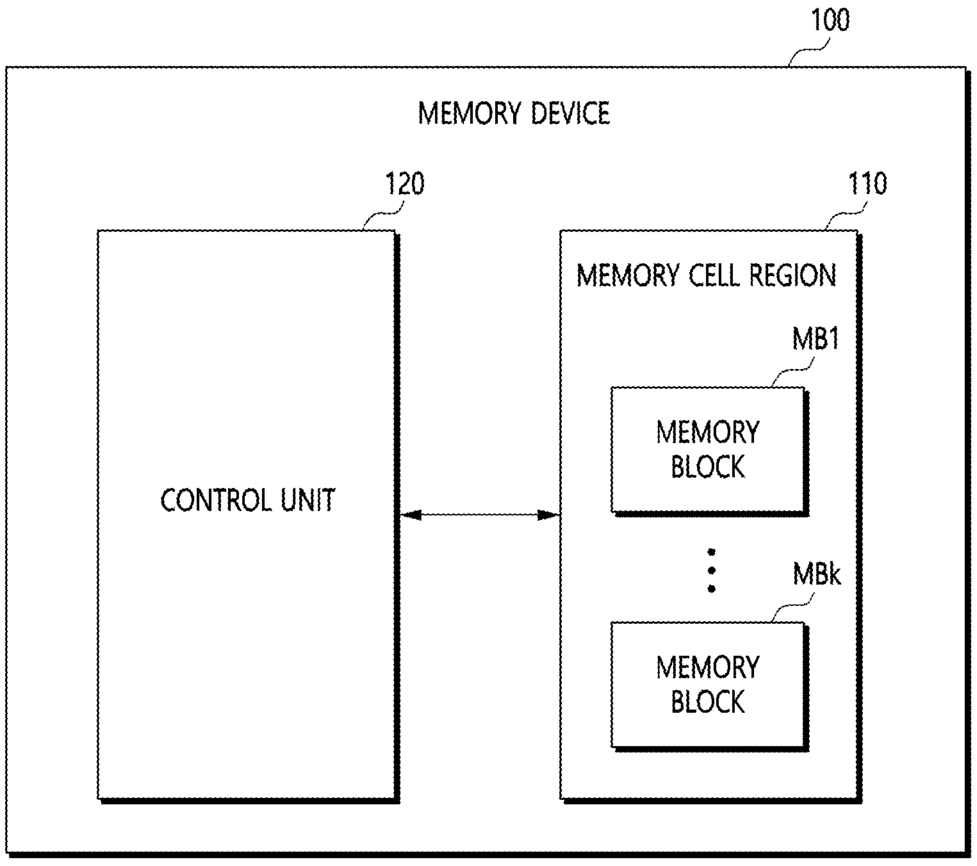
FIG. 1 is a block diagram illustrating a memory device according to an embodiment of the present disclosure.

FIG. 1 is a block diagram illustrating a memory device 100 according to an embodiment.

Referring to FIG. 1, the memory device 100 may store data internally under the control of an external device (not shown). The memory device 100 may include a memory cell region 110 and a control unit 120.

The memory cell region 110 includes a plurality of memory blocks MB1 through MBk. A memory block may be a unit on which the control unit 120 performs an erase operation in the memory cell region 110. Data stored in each memory block may be erased simultaneously.

Figure 2:
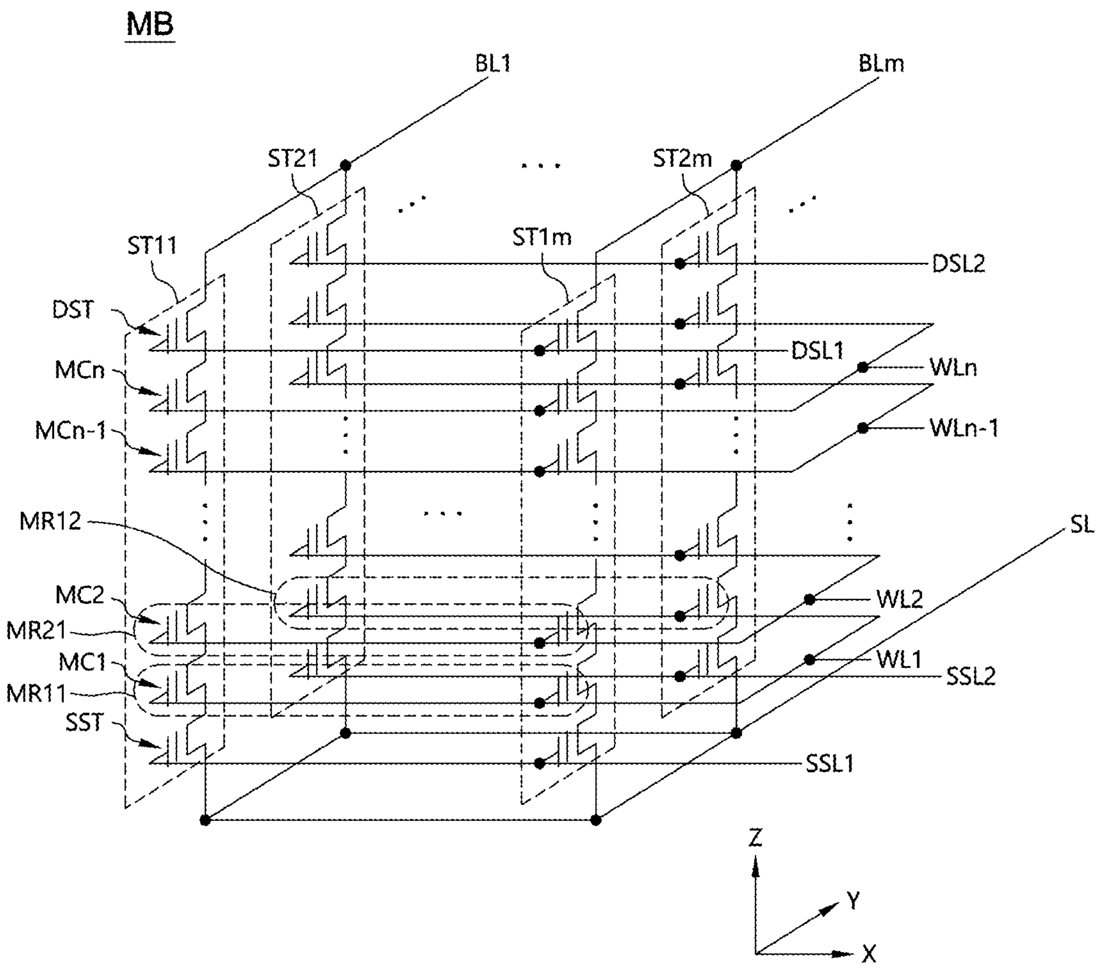
FIG. 2 is a block diagram illustrating a memory block according to an embodiment of the present disclosure.

FIG. 2 is a block diagram illustrating a memory block MB according to an embodiment. Each of the memory blocks MB1 through MBk of FIG. 1 may be configured similarly to the memory block MB of FIG. 2.

Referring to FIG. 2, the memory block MB is coupled to the control unit 120 through local selection lines DSL1, DSL2, SSL1, and SSL2, word lines WL1 through WLn, bit lines BL1 through BLm, and source line SL. As used throughout the detailed description, each of m and n is a positive integer.

The memory block MB includes strings ST11 through ST1*m* and ST21 through ST2*m*. Each of the strings ST11 through ST1*m* and ST21 through ST2*m* extends along a vertical direction (Z direction) in the example of FIG. 2.

Within the memory block MB, m strings are arranged in a row direction (X direction). In FIG. 2, only two strings are shown arranged in a column direction (Y direction) for illustrative purposes only, although three or more strings may be arranged in the column direction (Y direction).

The strings ST11 through ST1*m* and ST21 through ST2*m* may be configured identically. For example, a string ST11 includes a source selection transistor SST (or a first selection transistor), memory cells MC1 through MCn, and a drain selection transistor DST (or a second selection transistor) coupled in series with each other between a source line SL and a bit line BL1. A source of the source selection transistor SST is coupled to the source line SL, and a drain of the drain selection transistor DST is coupled to the bit line BL1 as shown in the example of FIG. 2. The memory cells MC1 through MCn are coupled in series with each other between the source selection transistor SST and the drain selection transistor DST.

Source selection transistors at the same position in a vertical direction may be configured as follows. The gates of the source selection transistors of strings arranged in the same row are coupled to the same local source selection line. For example, the gates of the source selection transistors of strings ST11 through ST1*m* of a first row are coupled to a local source selection line SSL1. For example, the gates of the source selection transistors of strings ST21 through ST2*m* of a second row are coupled to a local source selection line SSL2.

According to an embodiment, source selection transistors of strings of two or more rows are coupled in common to a single local source selection line. For example, the source selection transistors of strings ST11 through ST1*m* and ST21 through ST2*m* of the first and second rows are coupled in common to one local source selection line, and the source selection transistors of strings of the third and fourth rows (not shown) may also be coupled in common to the same local source selection line.

According to an embodiment, a plurality of source selection transistors is coupled in series between the source line SL and the memory cells of each string. The gates of the plurality of source selection transistors in each string are coupled to the plurality of local source selection lines. Each of the plurality of source selection transistors in each string may be configured similarly to the source selection transistor SST.

Drain selection transistors at the same position in a vertical direction may be configured as follows. The gates of the drain selection transistors of strings arranged in the same row are coupled to the same local drain selection line. For example, the gates of the drain selection transistors of the strings ST11 through ST1*m* of the first row are coupled to a local drain selection line DSL1. For example, the gates of the drain selection transistors of the strings ST21 through ST2*m* of the second row are coupled to a local drain selection line DSL2.

According to an embodiment, a plurality of drain selection transistors is coupled in series between each bit line and the memory cells of each string. The gates of the plurality of drain selection transistors of each string are coupled to the plurality of local drain selection lines. Each of the plurality of drain selection transistors in each string may be configured similarly to the drain selection transistor DST.

Strings arranged in the same column may be coupled to the same bit line. For example, strings ST1 and ST21 in a first column are coupled to the bit line BL1. For example, strings ST1*m* and ST2*m* in an mth column are coupled to a bit line BLm.

Gates of memory cells at the same position in a vertical direction may be coupled to the same word line. For example, in strings ST11 through ST1*m* and ST21 through ST2*m*, memory cells that are at the same position in a direction perpendicular to the memory cell MC1 are coupled to the word line WL1.

Among the memory cells, memory cells coupled to the same word line in the same row may constitute one memory region. For example, memory cells coupled to the word line WL1 in the first row constitute one memory region MR11. For example, memory cells coupled to the word line WL1 in the second row constitute one memory region MR12. For example, memory cells coupled to the word line WL2 in the first row constitute one memory region MR21. Depending on the number of rows, each word line may be coupled to multiple memory regions. The memory cells constituting one memory region may be accessed simultaneously.

According to an embodiment, the memory block MB is further coupled to one or more dummy word lines other than the word lines WL1 through WLn. In this example, the memory block MB further includes dummy memory cells coupled to the dummy word lines.

Referring to FIG. 1, the control unit 120 stores data in the memory cell region 110 and reads data from the memory cell region 110 under control of the external device.

The control unit 120 performs an erase operation to erase data stored in a selected memory block in the memory cell region 110. The control unit 120 performs the erase operation by controlling each string including one or more source selection transistors (or first selection transistors) coupled in series to the source line SL, one or more drain selection transistors (or second selection transistors) coupled in series to the bit line, and memory cells coupled in series between the source selection transistors and the drain selection transistors.

For example, the control unit 120 applies an erase voltage to a bit line while increasing the erase voltage during a rising period of the erase operation. Thus, the control unit 120 increases a voltage at the bit line during the rising period.

The control unit 120 applies a selection voltage to local selection lines coupled to source selection transistors and drain selection transistors of a string while increasing the selection voltage during a forcing period of the erase operation. Thus, the control unit 120 increases voltages at the local selection lines during the forcing period. The local selection lines include local source selection lines coupled to corresponding source selection transistors and local drain selection lines coupled to corresponding drain selection transistors. The forcing period may be part of the rising period. The forcing period may begin after the rising period begins and may end before the rising period ends.

According to an embodiment, the control unit 120 increases the selection voltage in a stepwise manner during the forcing period. According to an embodiment, the control unit 120 increases the selection voltage during the forcing period by at least one step above the selection voltage applied at the beginning of the forcing period. Because the selection voltage is increased by at least one step during the forcing period, the selection voltage at the end of the forcing period is higher than the selection voltage at the beginning of the forcing period. The selection voltage may be lower than an erase voltage during the same time period. That is, the voltages at the local selection lines may be lower than a voltage at a bit line during the same time period.

According to an embodiment, the control unit 120 applies a ground voltage to the local selection lines during the rising period until the forcing period begins. The control unit 120 floats the local selection lines from the end of the forcing period until the end of the erasing period. The erasing period is a time period following the rising period during which erasing period the voltage at the bit line is maintained at a target erase voltage, which target erase voltage may be the maximum voltage level of the erase voltage.

According to an embodiment, the control unit 120 includes a connection unit coupled between the local selection lines and global selection lines. The connection unit is configured to pass a selection voltage applied to the global selection lines to the local selection lines. The control unit 120 enables the connection unit no later than when the rising period begins and disables the connection unit at the end of the forcing period. Thus, the forcing period ends when the connection unit is disabled.

According to an embodiment, the control unit 120 applies the selection voltage to the global selection lines during the forcing period, such that the selection voltage is passed to the local selection lines through the connection unit. The global selection lines may include one or more global source selection lines and one or more global drain selection lines. The global source selection lines are coupled to the corresponding local source selection lines through the connection unit, and the global drain selection lines are coupled to the corresponding local drain selection lines through the connection unit.

According to an embodiment, the control unit 120 applies a ground voltage to the global selection lines during the rising period until the forcing period begins. The control unit 120 continues to apply the selection voltage applied at the end of the forcing period to the global selection lines from the end of the forcing period until the end of the erasing period. Thus, from the end of the forcing period until the end of the erasing period, the control unit 120 maintains the voltages at the global selection lines with the voltages applied to the global selection lines at the end of the forcing period.

The control unit 120 includes a processor, a voltage supply unit, and connection unit to perform the operations described above and with reference to FIG. 3.

According to various embodiments, the memory device 100 may include various types of memory such as NAND Flash memory, 3D NAND Flash memory, NOR Flash memory, Resistive Random Access Memory (RRAM), Phase-Change Memory (PRAM), Magnetoresistive Random Access Memory (MRAM), Ferroelectric Random Access Memory (FRAM), or Spin Transfer Torque Random Access Memory (STT-RAM).

Figure 3:
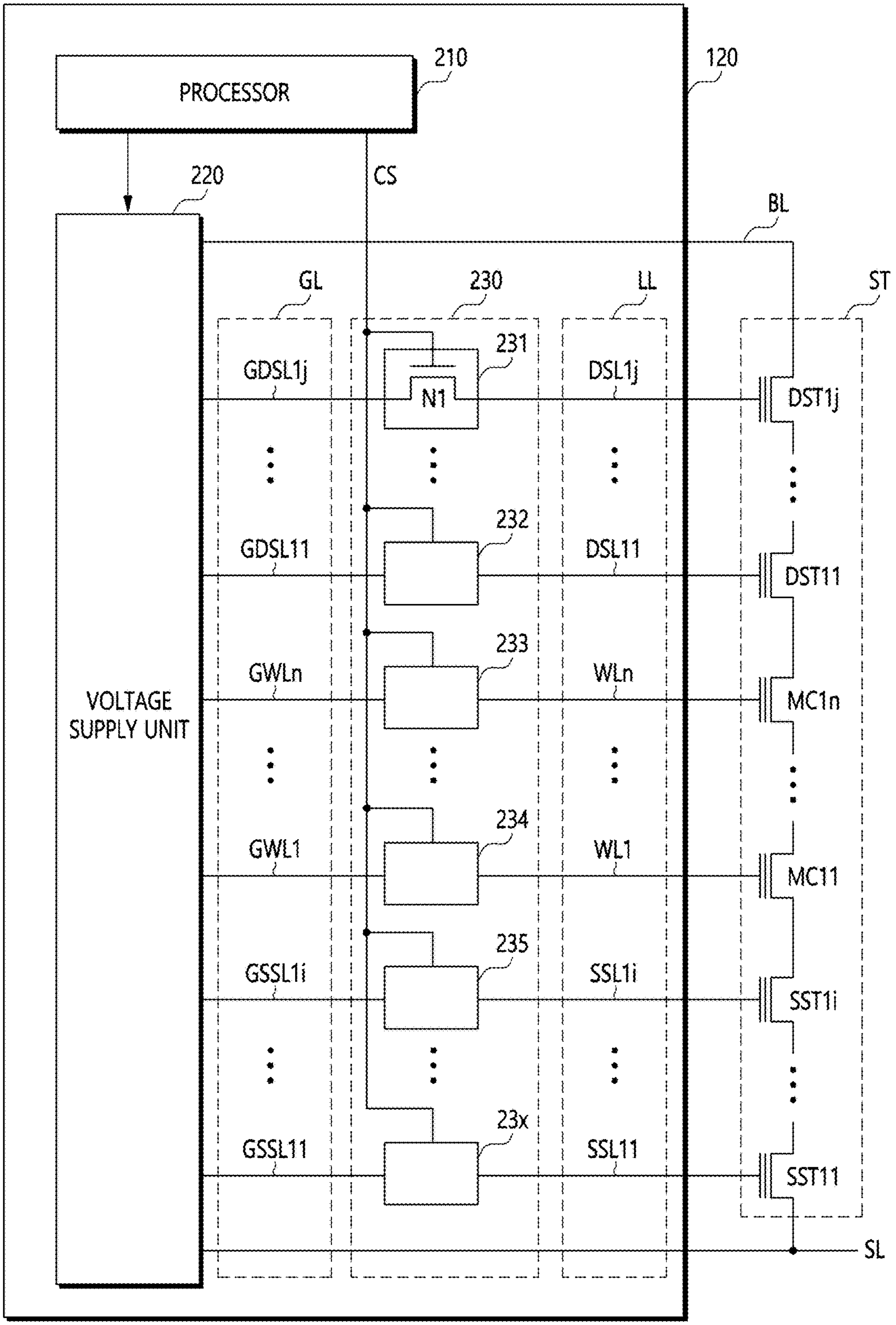
FIG. 3 is a block diagram detailing a control unit according to an embodiment of the present disclosure.

FIG. 3 is a block diagram detailing the control unit 120, such as the control unit 120 of FIG. 1, according to an embodiment.

Referring to FIG. 3, the control unit 120 includes a processor 210, a voltage supply unit 220, and a connection unit 230. Each of the processor 210, the voltage supply unit 220, and the connection unit 230 may comprise hardware, software, firmware, or a combination thereof. A string ST corresponds to each of the strings ST11 through ST1*m* and ST21 through ST2*m* in FIG. 2, and a bit line BL corresponds to each of the bit lines BL1 through BLm illustrated in FIG. 2. Each of the strings ST11 through ST1*m* and ST21 through ST2*m* in FIG. 2 may be configured and operated similarly to the string ST. The string ST includes one or more source selection transistors SST11 through SST1*i* coupled in series to a source line SL, one or more drain selection transistors DST11 through DST1*j* coupled in series to the bit line BL, and memory cells MC11 through MC1*n* coupled in series between the source selection transistors SST11 through SST1*i* and the drain selection transistors DST11 through DST1*j*. The source selection transistors SST11 through SST1*i* are coupled to local source selection lines SSL11 through SSL1*i*, respectively. The drain selection transistors DST11 through DST1*j* are coupled to local drain selection lines DSL11 through DSL1*j*, respectively. The memory cells MC11 through MC1*n* are coupled to word lines WL1 through WLn, respectively. As used throughout the detailed description, each of i and j is a positive integer.

The processor 210 controls the voltage supply unit 220 and the connection unit 230. The processor 210 controls the voltage supply unit 220 to supply predetermined voltages to each of the global lines GL and the bit line BL, depending on the type of operation to be performed. To control the connection unit 230, the processor 210 sends a connection signal CS to the connection unit 230.

The voltage supply unit 220 supplies voltage to global lines GL and the bit line BL. The global lines GL include one or more global source selection lines GSSL11 through GSSL1*i*, global word lines GWL1 through GWLn, and one or more global drain selection lines GDSL11 through GDSL1*j*.

The connection unit 230 couples the global lines GL with corresponding local lines LL in response to the connection signal CS. The local lines LL include one or more local source selection lines SSL11 through SSL1*i*, word lines WL1 through WLn, and one or more local drain selection lines DSL11 through DSL1*j*. The connection unit 230 includes sub-connection units 231 through 23*x*. As used throughout the detailed description, x is a positive integer. Each of the sub-connection units 231 through 23*x* is associated with one global line GL and one local line LL, referred to as a corresponding global line GL and a corresponding local line LL. Each of the sub-connection units 231 through 23*x* is coupled between a corresponding global line among the global lines GL and a corresponding local line among the local lines LL. For example, the sub-connection unit 231 is coupled between a global drain selection line GDSL1*j* and a local drain selection line DSL1*j*.

When each sub-connection unit is enabled in response to the connection signal CS in an enabled state, the sub-connection unit couples its corresponding global line to its corresponding local line. Each sub-connection unit, when enabled, transfers a voltage at its corresponding global line to its corresponding local line. When each sub-connection unit is disabled in response to the connection signal CS in a disabled state, the sub-connection unit disconnects its corresponding global line from its corresponding local line. Each sub-connection unit may float its corresponding local line when the sub-connection unit is disabled.

Each sub-connection unit may include an NMOS transistor coupled between the corresponding global line and the corresponding local line, such as an NMOS transistor N1 of sub-connection unit 231. The connection signal CS in an enabled state is at a voltage level that turns on the NMOS transistor of each sub-connection unit. The connection signal CS in a disabled state is at a voltage level that turns off the NMOS transistor of each sub-connection unit. When turned on in response to the connection signal CS, the NMOS transistor of each sub-connection unit transfer the voltage at its corresponding global line to its corresponding local line. The NMOS transistor of each sub-connection unit may float its corresponding local line when the NMOS transistor is turned off in response to the connection signal CS.

Figure 4:
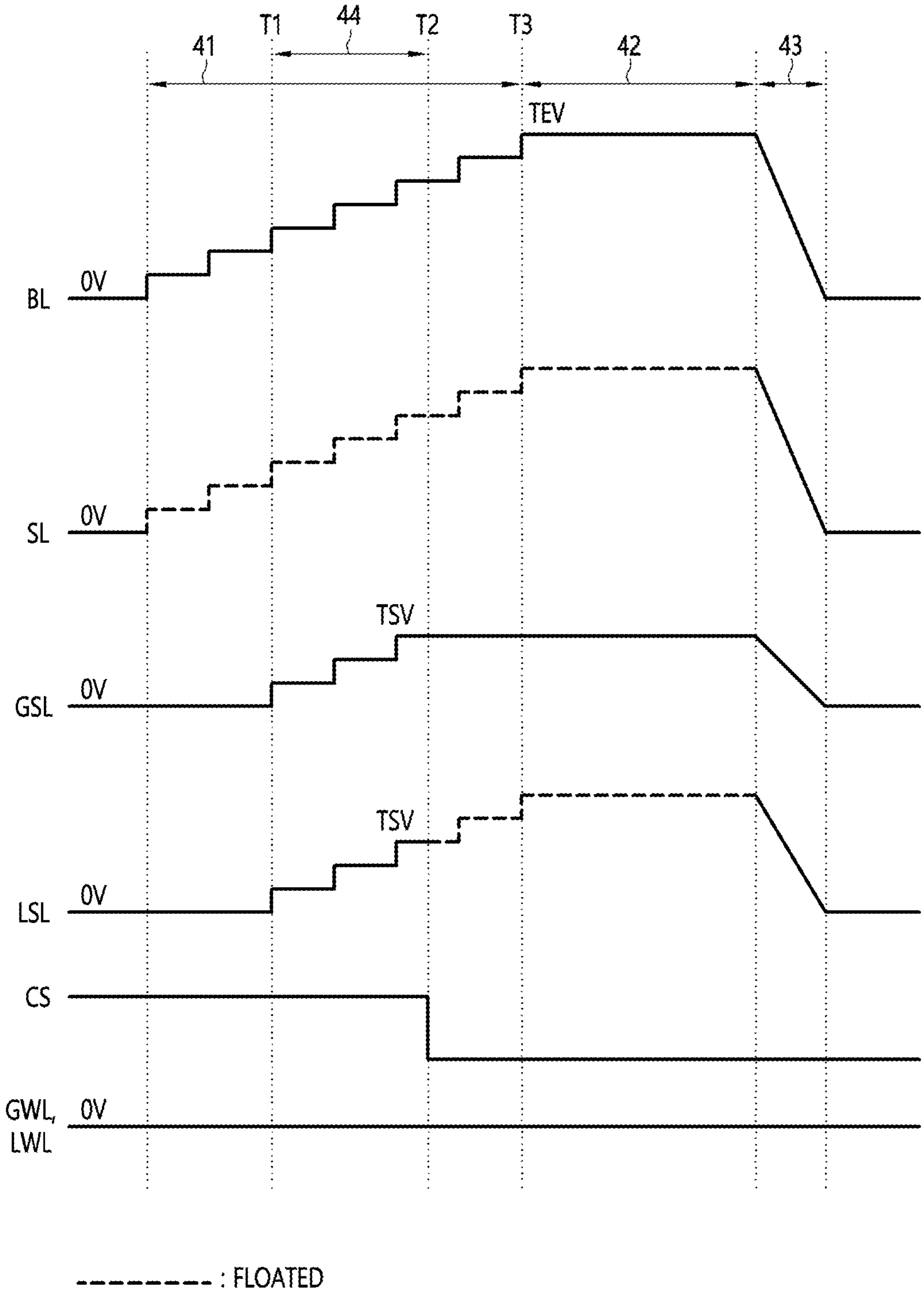
FIG. 4 is a timing diagram during an erase operation on a string according to an embodiment of the present disclosure.

FIG. 4 is a timing diagram illustrating various voltages during an erase operation, for example, for the string ST shown in FIG. 3, according to an embodiment. The erase operation for each of strings ST11 through ST1*m* and ST21 through ST2*m* of FIG. 2 may be performed simultaneously and similarly to the erase operation for the string ST, and the entire memory block MB may be erased.

Referring to FIG. 4, the erase operation includes a rising period 41, an erasing period 42, and a discharging period 43.

The rising period 41 is a period during which the voltage at the bit line BL rises to a target erase voltage TEV. During the rising period 41, the voltage at bit line BL may rise in a stepwise manner. A stepwise manner includes, for example, a sharp or steep rise followed by a relatively flat or constant run.

The erasing period 42 begins at time T3 when the voltage at bit line BL reaches the target erase voltage TEV. The erasing period 42 is a period during which the voltage at the bit line BL is maintained at the target erase voltage TEV. The erasing period 42 may be a period during which data stored in the memory cells MC11 through MC1*n* is erased by holes accumulated in the channel of the memory cells due to Gate Induced Drain Leakage (GIDL).

The discharging period 43 is a period during the erase operation when the voltage applied to the bit line BL is discharged.

The voltage of the source line SL may be floated during the rising period 41 and the erasing period 42. Thus, the voltage at the source line SL may rise similarly to the voltage at the bit line BL due to coupling effect with the bit line BL during the rising period 41 and may be maintained similarly to the voltage at the bit line BL during the erasing period 42.

The forcing period 44 is a part of the rising period 41. The end time T2 of the forcing period 44 is the time when the connection signal CS changes from an enabled state, such as a logic high level, to a disabled state, such as a logic low level. The start time T1 and end time T2 of the forcing period 44 may be determined through testing to be efficient times suitable for the characteristics of the memory device 100. According to an embodiment, the end time T2 of the forcing period 44 occurs when the selection voltage reaches a predetermined target selection voltage TSV.

The voltage supply unit 220 applies a ground voltage, such as 0V, to the global selection lines GSL during the rising period 41 until the forcing period 44 begins. The voltage supply unit 220 applies an increasing selection voltage to the global selection lines GSL during the forcing period 44. The selection voltage may increase in a stepwise manner, for example, step by step, up to the target selection voltage TSV as shown. The selection voltage may be increased gradually by a predetermined incremental amount up to the target selection voltage TSV. According to an embodiment, the selection voltage may alternatively be increased to the target selection voltage TSV in a manner other than a stepwise manner, for example, linearly, gently including slowly and gradually, or continuously. The global selection lines GSL include, for example, one or more of the global source selection lines GSSL11 through GSSL1*i* and one or more of the global drain selection lines GDSL11 through GDSL1*j* shown in FIG. 3.

The voltage supply unit 220 maintains the voltages applied at the global selection lines GSL at the end of the forcing period 44, such as the target selection voltage TSV, from the end of the forcing period 44 at T2 until the end of the erasing period 42. As a result, current leakage from the local selection lines LSL to the global selection lines GSL may be prevented or reduced. The local selection lines LSL include, for example, one or more local source selection lines SSL11 through SSL1*i* and one or more local drain selection lines DSL11 through DSL1*j* such as shown in FIG. 3.

The control unit 120 generates the connection signal CS in an enabled state from the beginning of the rising period 41, at the latest, and changes the connection signal CS from an enabled state to a disabled state at the end time T2 of the forcing period 44. The connection unit 230 is enabled in response to the connection signal CS in an enabled state, during the rising period 41 until the forcing period 44 ends and couples the global selection lines GSL with the corresponding local selection lines LSL.

The local selection lines LSL are coupled with the corresponding global selection lines GSL during the rising period 41 until the end time T2 of the forcing period 44. Thus, a ground voltage is transferred from the global selection lines GSL to the local selection lines LSL during the rising period 41 until the forcing period 44 begins. During the forcing period 44, an increasing selection voltage is transferred from the global selection lines GSL to the local selection lines LSL in a stepwise manner. Thus, the same voltage difference between the voltage at the bit line BL at the start time T1 of the forcing period 44 and the voltage at each of the local selection lines LSL is maintained throughout the forcing period 44, and a GIDL is generated in the selection transistors, such as the source selection transistors SST11 through SST1*i* and the drain selection transistors DST11 through DST1*j*, coupled to the local selection lines LSL.

Because the connection unit 230 is disabled from the end time T2 of the forcing period 44 until the end of the erasing period 42, the local selection lines LSL are floated. Thus, the voltages at the local selection lines LSL rise due to the coupling effect with the bit line BL.

The global word lines GWL, such as GWL1 to GWLn in FIG. 3, and word lines LWL, such as WL1 through WLn in FIG. 3, are maintained at the ground voltage during the erase operation.

Upon completion of the erase operation, the data stored in the memory cells MC11 through MC1*n* is erased by the holes introduced into the channel of the memory cells by the GIDL.

Figure 5:
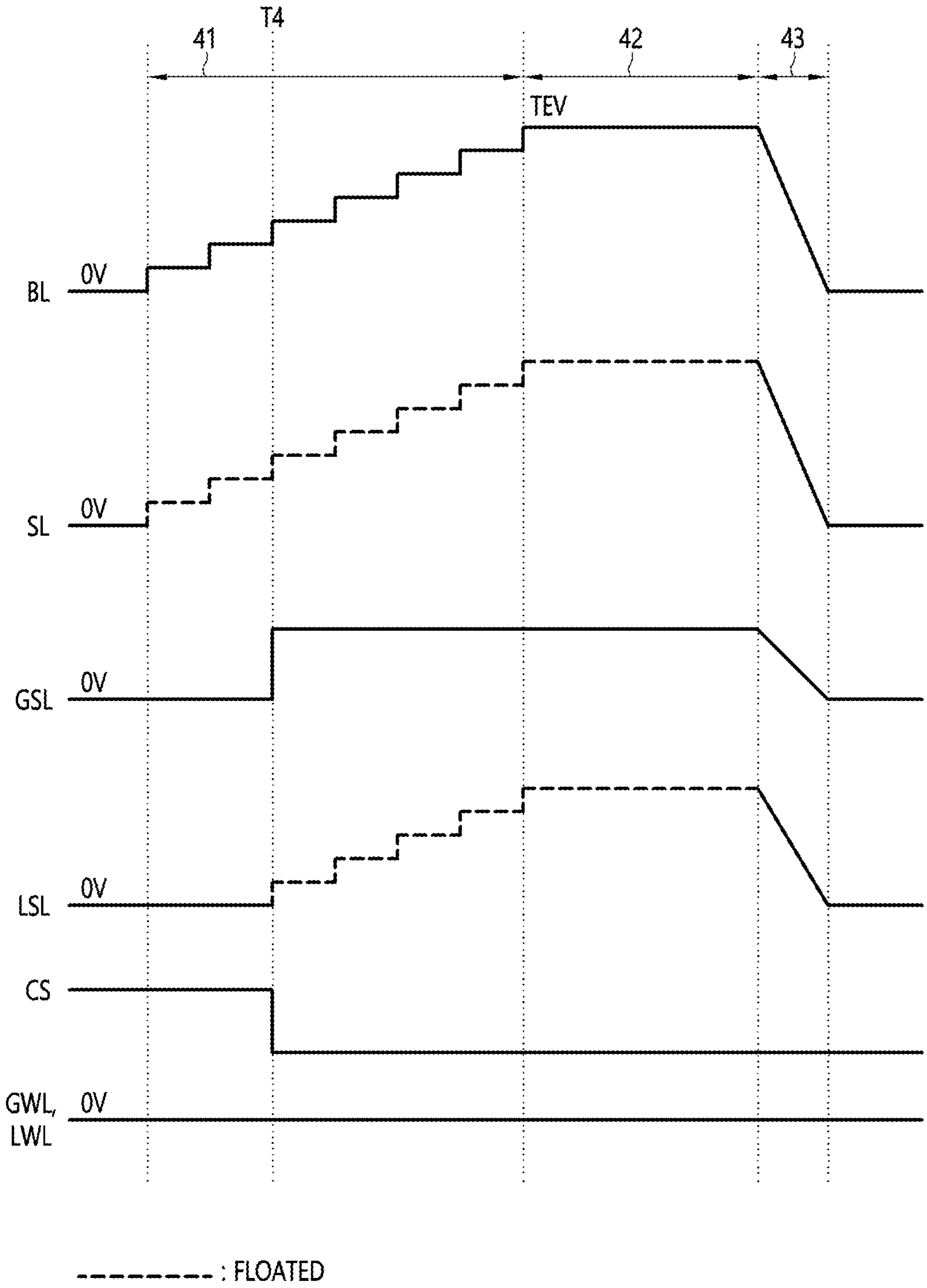
FIG. 5 is a timing diagram during an alternative method of performing an erase operation according to an embodiment of the present disclosure.

FIG. 5 is a timing diagram during an alternative method of performing the erase operation, for example, as performed by the control unit 120 on the string ST of FIG. 3.

Referring to FIG. 5, the erase operation may be performed without the forcing period 44 of FIG. 4 during which an increasing selection voltage is applied to the local selection lines LSL.

The control unit 120 generates a connection signal CS that changes from an enabled state to a disabled state at a predetermined floating time T4 during the rising period 41. The connection unit 230 disconnects the global selection lines GSL and local selection lines LSL at the floating time T4 in response to the connection signal CS reaching the disabled state.

The voltage supply unit 220 applies a ground voltage to the global selection lines GSL until the floating time T4. Thus, the ground voltage is transferred from the global selection lines GSL to the local selection lines LSL until the floating time T4.

The voltage supply unit 220 applies a predetermined selection voltage to the global selection lines GSL from the floating time T4 until the end of the erasing period 42. The voltages on the global selection lines GSL are maintained at the predetermined selection voltage from the floating time T4 until the end of the erasing period 42.

The local selection lines LSL are floated from the floating time T4 until the end of the erasing period 42. The voltages at the local selection lines LSL may rise due to the coupling effect with the bit line BL, and GIDL may occur on the selection transistors of the string ST.

The global word lines GWL and word lines LWL are maintained at the ground voltage during the erase operation.

Data stored in memory cells MC11 through MC1*n* may be erased by holes introduced into the channel of the memory cells by GIDL. Due to various causes, however, the voltages at the floated local selection lines LSL may not rise properly due to the coupling effect with the bit line BL alone, and GIDL may not sufficiently occur in the selection transistors in this situation.

The memory cells MC11 through MC1*n* may not be properly erased, which may reduce the reliability of the memory device 100.

Because the erase operation described with reference to FIG. 4 includes the forcing period 44 during which the selection voltage is applied to the local selection lines LSL, sufficient GIDL is generated on the selection transistors and the memory cells MC11 through MC1*n* may be completely erased.

Figure 6:
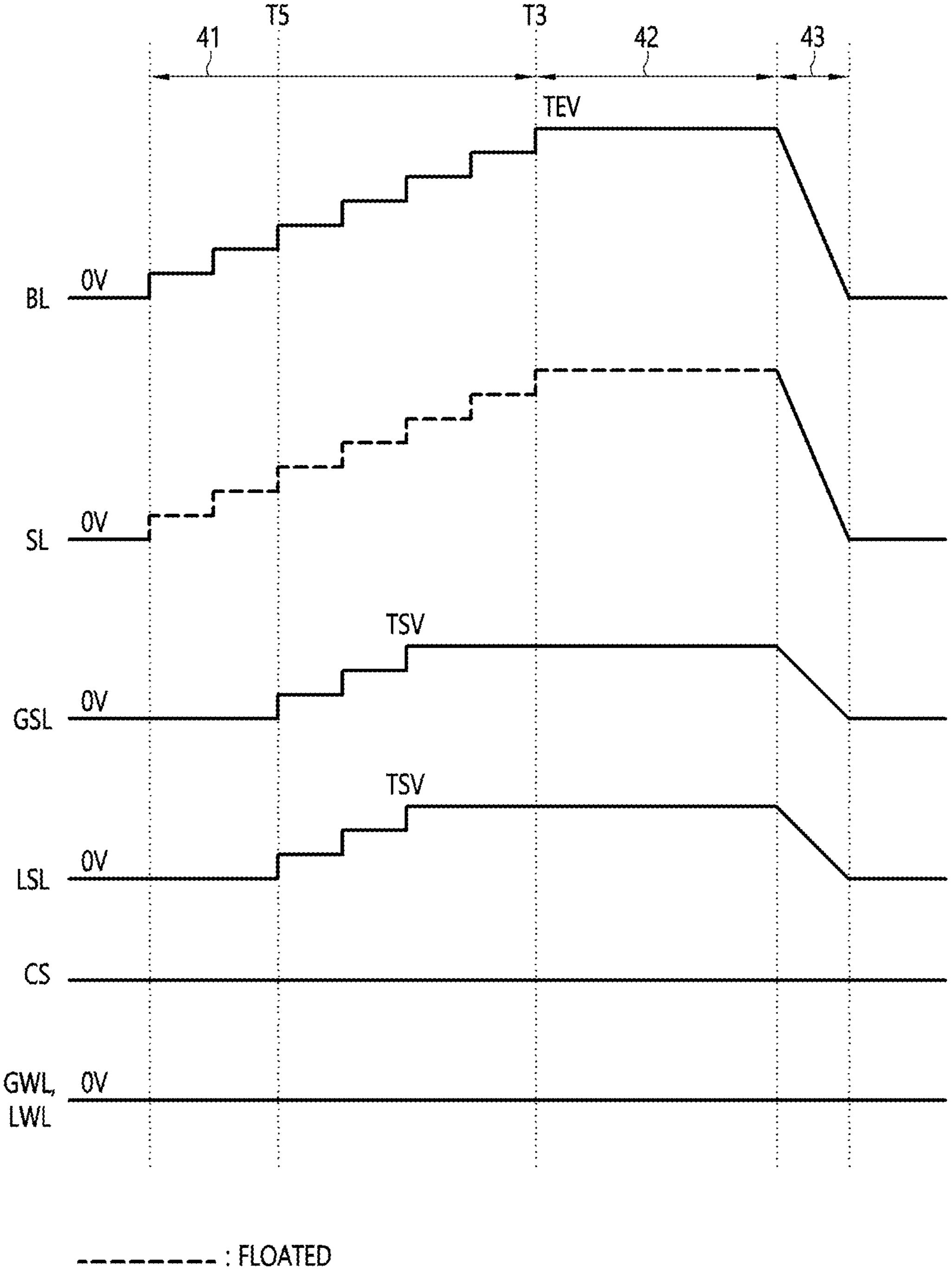
FIG. 6 is a timing diagram during an alternative method of performing an erase operation according to an embodiment of the present disclosure.

FIG. 6 is a timing diagram during an alternative method of performing the erase operation, for example, as performed by the control unit 120 on the string ST of FIG. 3.

Referring to FIG. 6, the control unit 120 generates the connection signal CS in an enabled state during the rising period 41, the erasing period 42, and the discharging period 43. The connection unit 230 continues to couple the global selection lines GSL and local selection lines LSL in response to receiving the connection signal CS in the enabled state.

The voltage supply unit 220 applies a ground voltage to the global selection lines GSL up to a predetermined forcing time T5 during the rising period 41. Thus, the local selection lines LSL are maintained at the ground voltage until the forcing time T5.

The voltage supply unit 220 applies an increasing selection voltage in a stepwise manner to the global selection lines GSL from the forcing time T5 to the end time T3 of the rising period 41. Thus, the local selection lines LSL receive an increasing selection voltage from the global selection lines GSL in a stepwise manner from the forcing time T5 to the end time T3 of the rising period 41. The selection voltage may be increased up to the target selection voltage TSV, for example, a maximum voltage level of the selection voltage. As a result, GIDL may occur on the selection transistors of the string ST. During the erasing period 42, the voltages at the global selection lines GSL and the local selection lines LSL are maintained at the target selection voltage TSV.

The global word lines GWL and word lines LWL are maintained at the ground voltage during the erase operation.

As a result, the data stored in the memory cells MC11 through MC1*n* may be erased by the holes introduced into the channel of the memory cells by the GIDL. Nevertheless, because the selection voltage is still applied to the global selection lines GSL and the local selection lines LSL during the rising period 41 and the erasing period 42, unnecessary current consumption may become problematic. In addition, if the maximum voltage level, such as the target selection voltage TSV, of the selection voltage that can be applied by the voltage supply unit 220 is too low, excessive GIDL may occur.

The erase operation described with reference to FIG. 4, however, causes the local selection lines LSL to float after the forcing period 44. Thus, excessive GIDL may be suppressed because the voltages at floated local selection lines LSL may be higher than the target selection voltage TSV for a period of time, for example, from the end time T2 of the forcing period 44 to the start time T3 of the erasing period 42. Furthermore, because, during the erase operation described with reference to FIG. 4, the selection voltage is applied to the local selection lines LSL only during the forcing period 44, unnecessary current consumption may be suppressed.

A person skilled in the art to which the present disclosure pertains can understand that the present disclosure may be carried out in other specific forms without changing its technical spirit or essential features. Therefore, the embodiments described above are illustrative in all aspects, not limitative. Therefore, the scope of the present disclosure should not be limited to the foregoing embodiments. All changes within the meaning and range of equivalency of the claims are to be included within their scope.

What is claimed is:

1. A memory device comprising:

memory cells coupled in series between one or more first selection transistors coupled in series to a source line and one or more second selection transistors coupled in series to a bit line; and a control unit including a voltage supply unit configured to output a selection voltage while increasing a voltage level of the selection voltage during a forcing period that is included in a rising period during which an erase voltage is applied to the bit line and increases;

wherein the control unit is configured to apply, during the forcing period, the selection voltage output from the voltage supply unit to local selection lines coupled to the one or more first selection transistors and the one or more second selection transistors, and to float the local selection lines after an end of the forcing period.

2. The memory device of claim 1, wherein the control unit is further configured to increase the selection voltage in a stepwise manner during the forcing period.

3. The memory device of claim 2, wherein the control unit is further configured to increase the selection voltage by at least one step during the forcing period.

4. The memory device of claim 1, wherein the forcing period begins after the rising period begins and ends before the rising period ends.

5. The memory device of claim 1, wherein the control unit is further configured to apply a ground voltage to the local selection lines during the rising period until the forcing period begins.

6. The memory device of claim 1, wherein the control unit is further configured to float the local selection lines from an end of the forcing period until an end of an erasing period during which a voltage at the bit line is maintained at a target erase voltage.

7. The memory device of claim 1, wherein the control unit further comprises:

a connection unit coupled between the local selection lines and global selection lines and configured to transfer voltages applied to the global selection lines to corresponding local selection lines; and wherein the voltage supply unit is configured to supply the voltages to the global selection lines and to apply the selection voltage to the global selection lines during the forcing period.

8. The memory device of claim 7, wherein the control unit is further configured to enable the connection unit no later than when the rising period begins and configured to disable the connection unit at an end of the forcing period.

9. The memory device of claim 7, wherein the voltage supply unit is further configured to apply a ground voltage to the global selection lines during the rising period until the forcing period begins.

10. The memory device of claim 7, wherein the voltage supply unit is further configured to, from an end of the forcing period until an end of an erase period, apply the selection voltage applied at the end of the forcing period to the global selection lines, during which erasing period a voltage at the bit line is maintained at a target erase voltage.

11. A memory device comprising:

memory cells coupled in series between one or more first selection transistors coupled in series to a source line and one or more second selection transistors coupled in series to a bit line; and a control unit including a connection unit coupled between global selection lines and local selection lines coupled to the one or more first selection transistors and the one or more second selection transistors;

wherein an erase voltage applied to the bit line increases during a rising period including a forcing period;

wherein the control unit is configured to, during the forcing period, apply voltages to the global selection lines such that voltage levels of the global selection lines increase;

wherein the control unit is further configured to enable the connection unit during the forcing period such that voltages applied to the global selection lines are transferred to the local selection lines; and wherein the control unit is further configured to disable the connection unit at an end of the forcing period.

12. The memory device of claim 11, wherein the control unit is further configured to maintain the global selection lines at a ground voltage during the rising period until the forcing period begins.

13. The memory device of claim 11, wherein the control unit is further configured to float the local selection lines from the end of the forcing period until an end of an erasing period.

14. The memory device of claim 11, wherein the control unit is further configured to maintain voltage levels of the global selection lines at the voltage levels at the end of the forcing period from the end of the forcing period until an end of an erasing period.

15. A memory device comprising:

memory cells coupled in series between one or more first selection transistors coupled in series to a source line and one or more second selection transistors coupled in series to a bit line, the one or more first selection transistors and the one or more second selection transistors coupled to local selection lines; and a control unit including a voltage supply unit;

wherein the control unit is configured to, during a rising period during which an erase voltage applied to the bit line increases, control an output level of the voltage supply unit and apply, to the local selection lines, a voltage output from the voltage supply unit such that voltage levels of the local selection lines increase to a target selection voltage; and wherein the control unit is further configured to float the local selection lines before an end of the rising period.

16. The memory device of claim 15, wherein the control unit is further configured to float the local selection lines until an end of an erasing period, during which erasing period a voltage at the bit line is maintained at a target erase voltage after the rising period.

17. The memory device of claim 15, wherein the control unit further comprises:

a connection unit coupled between the local selection lines and global selection lines and configured to transfer voltages applied to the global selection lines to corresponding local selection lines; and wherein the voltage supply unit is coupled to the global selection lines and is configured to increase the voltages at the global selection lines to the target selection voltage during the rising period.

18. The memory device of claim 17, wherein the control unit is further configured to float the local selection lines by disabling the connection unit.

19. The memory device of claim 17, wherein the voltage supply unit is further configured to maintain the global selection lines at the target selection voltage from a time when the local selection lines are floated until an erasing period ends.

* * * * *